United States Patent
Askman et al.

[11] Patent Number: 5,997,931
[45] Date of Patent: Dec. 7, 1999

[54] PROCESS FOR BLANCHING OR COOKING PASTA

[75] Inventors: Lars Askman, Billesholm; Werner Leonhardt, Astorp, both of Sweden

[73] Assignee: Nestec S.A., Vevey, Switzerland

[21] Appl. No.: 08/288,127

[22] Filed: Aug. 10, 1994

[30] Foreign Application Priority Data

Aug. 28, 1993 [EP] European Pat. Off. .............. 93113788

[51] Int. Cl.⁶ ............................... A23B 7/06; A23L 1/16; A23L 1/162
[52] U.S. Cl. ......................... 426/496; 426/451; 426/455; 426/497; 426/503; 426/508; 426/518; 99/407
[58] Field of Search ................... 426/496, 497, 426/451, 455, 503, 508, 518; 99/407

[56] References Cited

U.S. PATENT DOCUMENTS

| | | |
|---|---|---|
| 2,905,105 | 9/1959 | Lombi . |
| 4,522,217 | 6/1985 | D'Alterio . |
| 4,543,878 | 10/1985 | Luchetti . |
| 4,752,491 | 6/1988 | D'Alterio et al. ...................... 426/451 |
| 4,968,519 | 11/1990 | Catelli . |
| 5,191,829 | 3/1993 | Caffarella ................................. 99/352 |
| 5,350,589 | 9/1994 | Weinstein ................................ 426/496 |
| 5,351,605 | 10/1994 | Sai et al. .................................. 99/407 |

FOREIGN PATENT DOCUMENTS

| | | |
|---|---|---|
| 58-18055 | 4/1983 | Japan . |
| 62-22612 | 1/1987 | Japan . |

OTHER PUBLICATIONS

English Translation of Oki, Japanese Kokai No. 62–22612 (1987).
Derwent Abstract Accession No. 87–069040 for Japanese Koaki 62–22612.

*Primary Examiner*—Helen Pratt
*Attorney, Agent, or Firm*—Vogt & O'Donnell, LLP

[57] ABSTRACT

Pasta dough is blanched or cooked by forming a pasta dough into a plurality of continuous pasta dough strands and simultaneously directing leading ends of the continuous strands and water at a temperature sufficient to blanch or cook the strands into the inlet end of a pipe which descends vertically from the inlet end to an outlet end. The water contacts the strands and draws and conveys the strands through the pipe for a time sufficient to blanch or cook the strands. As the blanched or cooked strands and water exit from the pipe through the outlet end, the continuous strands are conveyed away from the pipe while draining and collecting water, which is recirculated to the pipe inlet end.

14 Claims, 1 Drawing Sheet

PROCESS FOR BLANCHING OR COOKING PASTA

BACKGROUND OF THE INVENTION

The present invention relates to an apparatus and process for blanching or cooking pastas.

In the aqueous blanching of pasta strands it is usually necessary to transport the pasta strands on conveyor belts in a long flat unit about 25 metres long which takes up a great deal of space.

In the commercial cooking of fresh pasta products, there is often used a conveyor system which carries the pasta product through a tank of hot water along a submerged horizontal zigzag travel path. For example, U.S. Pat No. 2,905,105 describes a stack of closely spaced, parallel conveyors wherein the top run of the endless belts of adjacent conveyors travel in opposite directions. Another type of conveyor system comprises a pair of continuous belts which are held with a uniform spacing between them during their horizontal zigzag travel through the hot water and such systems are described in U.S. Pat. No. 4,522,217 and U.S. Pat. No. 4,752,491. However, conveyor belts are expensive. They also easily become worn or broken especially when travelling through hot water, leading to costly breakdowns.

In addition, when blanching using the conveyor systems described in U.S. Pat. No. 4,522,217 and U.S. Pat. No. 4,752,491 where the pasta strand is horizontally conveyed through the blanching tank between two parallel zigzag conveyors, there are practical difficulties because the pasta strand absorbs water and thus gradually expands both in width and in length which means that the speed of the strand at the outfeed end of the tank should be higher than at the infeed end. However, this is impossible to attain since it is the same endless conveyors which enter and leave the tank.

SUMMARY OF THE INVENTION

We have now devised a blanching process for blanching or cooking pasta strands which eliminates the use of conveyor belts during the blanching or cooking step and significantly reduces the space required in the factory.

According to the present invention there is provided a process for blanching or cooking a pasta strand which comprises feeding a pasta strand and hot water to the inlet of a pipe, conveying the pasta strand and hot water through the pipe for blanching or cooking the pasta strand, draining water from the blanched or cooked pasta strand as it exits from the pipe and recirculating the drained water to the inlet of the pipe.

DETAILED DESCRIPTION OF THE INVENTION

The pasta strand may be formed by conventional means, e.g. by extruding or by kneading/sheeting/calibrating the pasta dough into one or more parallel strands. Conveniently, the pasta dough is cut after kneading/sheeting/calibrating or extrusion into a plurality of strands, e.g. from 2 to 200 and more usually from 50 to 150 strands. The process of the present invention is particularly suitable for blanching or cooking string-shaped pasta strands such as for making spaghetti, tagliatelli, linguine or penne.

The water that is fed to the inlet of the pipe is conveniently at a temperature suitable for blanching or cooking the pasta strand, e.g. from 90° to 100° C. and preferably from 95° to 98.5° C. The temperature of the water leaving the pipe is usually about 1° to 3° C. lower than the temperature of the water fed to the inlet of the pipe.

The pipe may be straight but is preferably bent or curved in shape, e.g. zigzag or helical in order to occupy less space than if it were straight. The pipe may be flexible or rigid. When rigid it may conveniently be made of stainless steel and when flexible it may conveniently be made from a temperature resistant elastomer.

The length of the pipe and the rate of flow of the pasta strand through the pipe should be chosen to enable each part of the pasta strand to spend sufficient time within the pipe to enable it to be blanched or cooked whichever is desired. For instance, the length of the pipe may conveniently be from 4 to 40 metres and typically from 10 to 30 metres while the rate of flow of the pasta through the pipe may conveniently be from 1 to 4 metres per minute and typically from 2 to 3 metres per minute. The times necessary for blanching or cooking are well-known to the art-skilled and a blanching process, for instance, would usually take from 1 to 6 minutes, preferably from 2 to 5 minutes while a cooking process would usually take from 2 to 15 minutes, preferably from 3 to 10 minutes.

When the pasta strand exits from the pipe, it is conveniently transferred to a meshed or perforated conveyor belt on which it is transported and which allows the surplus water to drain off. The water is conveniently collected in a tank from where it is advantageously pumped through a water pipe back to the inlet of the pipe. Preferably, the drained water is reheated to the appropriate temperature, for instance by passing through a heater before it is fed to the inlet pipe. The water may be topped up if and when necessary through a tap fitted to the water pipe to make up for any losses.

After the water has been drained off the pasta strand, the pasta strand is transported to a cutter, e.g. a guillotine cutter where it is cut transversely into appropriate lengths, e.g. from 10 to 500 mm. Advantageously, the pasta dough is extruded or kneaded/sheeted/calibrated continuously and the pasta strand or strands are conveyed continuously through the pipe together with the recirculating water to give a continuous process.

The process of the present invention may be automatically controlled using electronically monitored, computer controlled and synchronised drives and electronically synchronised guillotine cutting. The mechanical structure of the parts used for the process is very simple, high production capacity can be achieved and high weight accuracy can be obtained.

BRIEF DESCRIPTION OF THE DRAWINGS

The present invention is further described by way of example only with reference to the accompanying drawing in which.

DETAILED DESCRIPTION OF THE DRAWINGS

Figure 1:
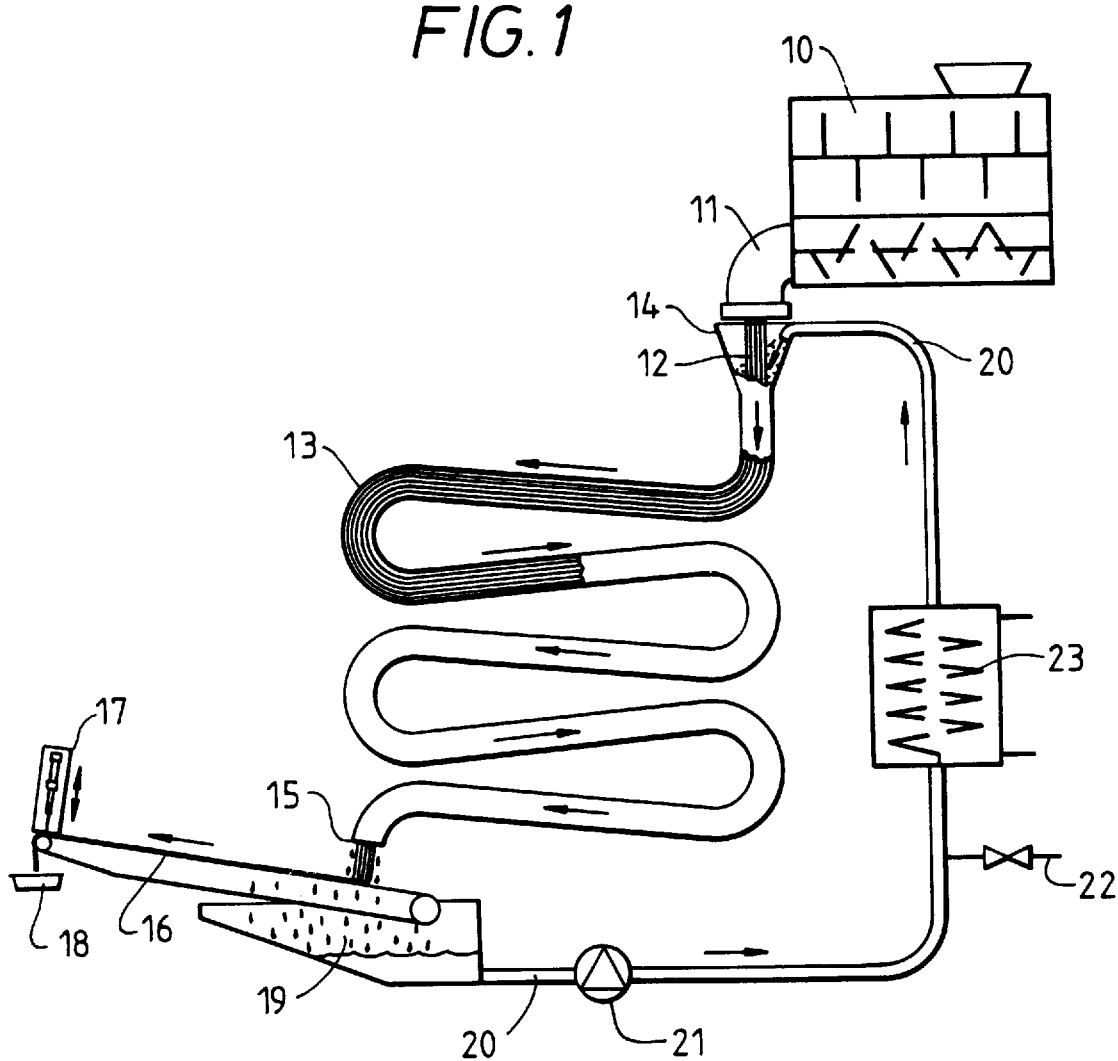
FIG. 1 represents a diagrammatic side view of a system for carrying out the process.

Referring to the drawing, the system comprises a mixer 10 for preparing the pasta dough, an extruder 11 for extruding a plurality of string shaped pasta strands 12, a zigzag shaped pipe 13 having an inlet 14 and an outlet 15, a meshed conveyor belt 16, a guillotine cutter 17, a receptacle 18, a tank 19, a water pipe 20, a pump 21, a tap 22 for supplying additional water and a heater 23.

In operation, the pasta dough in the mixer 10 is extruded from the extruder 11 into a plurality of spaghetti strands 12 which are fed together with water at 97° C. from the water pipe 20 to the inlet 14 of the pipe 13 having a length of 20 metres through which they are conveyed over a period of four minutes from the inlet to the outlet 15 whereupon the blanched spaghetti strands together with the water fall onto the meshed conveyor belt 16. The surplus water flows through the meshes into the tank 19 and the drained spaghetti strands are transported to the guillotine cutter 17 where they are cut transversely into suitable lengths of spaghetti which fall into the receptacle 18. The water from the tank 19 which has cooled to 95° C. is pumped by the pump 21 through the water pipe 20 to the inlet 14 of the pipe 13 passing through the heater 23 where it is reheated to 97° C. Additional water may be provided by the tap 22, if necessary, to make up for any losses.

The process is automatically controlled using electronically monitored, computer controlled and synchronised drives and electronically synchronised guillotine cutting.

We claim:

1. A process for blanching or cooking pasta comprising:

preparing a pasta dough;

forming the dough into a plurality of continuous pasta dough strands;

simultaneously directing leading ends of the continuous strands and water at a temperature sufficient to blanch or cook the strands into an inlet end of a pipe having a length which descends vertically from the inlet end to an outlet end, so that the water contacts the strands and draws and continuously conveys the strands through the length of the pipe, the continuous strands extending from the inlet to the outlet, for a time sufficient to blanch or cook the strands and so that the cooked or blanched strands and water exit from the pipe through the outlet end;

conveying the cooked or blanched strands exiting the pipe away from the outlet end and draining and collecting water from the pipe and the strands as the strands are conveyed; and recirculating the drained and collected water to the pipe inlet end.

2. A process according to claim 1 wherein the water directed into the inlet end has a temperature of from 90° C. to 100° C.

3. A process according to claim 1 wherein the water directed into the inlet end has a temperature of from 95° C. to 98.5° C.

4. A process according to claim 1 wherein the strands are conveyed through the pipe at a rate of from 1 m/min to 4 m/min.

5. A process according to claim 1 wherein the strands are conveyed through the pipe at a rate of from 2 m/min to 3 m/min.

6. A process according to claim 1 wherein the pipe has a length of from 4 m to 40 m.

7. A process according to claim 1 wherein the pipe has a length of from 10 m to 30 m.

8. A process according to claim 1 wherein the pipe has a zigzag or helical shape.

9. A process according to claim 1 wherein the pasta dough is formed into continuous strands of spaghetti, tagliatelli or linguine.

10. A process according to claim 1 wherein the pasta dough is formed into continuous strands of penne.

11. A process according to claim 1 wherein the strands exiting from the pipe outlet end are directed to a perforated conveyor belt and transported on the belt for draining water from the pasta strands.

12. A process according to claim 1 further comprising heating the drained and collected water to a temperature of from 90° C. to 100° C. before recirculating the water to the pipe inlet end.

13. A process according to claim 1 further comprising cutting the drained strands into a plurality of lengths.

14. A process according to claim 1 wherein the continuous pasta dough strands are extruded into the pipe inlet end.

* * * * *